US012755300B2

(12) United States Patent
Tanaka

(10) Patent No.: US 12,755,300 B2
(45) Date of Patent: Oct. 6, 2026

(54) INFORMATION PROCESSING DEVICE, RESTAURANT SYSTEM, INFORMATION PROCESSING METHOD, AND STORAGE MEDIUM STORING PROGRAM

(71) Applicant: Kura Sushi, Inc., Sakai (JP)

(72) Inventor: Kunihiko Tanaka, Sakai (JP)

(73) Assignee: Kura Sushi, Inc.

( * ) Notice: Subject to any disclaimer, the term of this patent is extended or adjusted under 35 U.S.C. 154(b) by 0 days.

(21) Appl. No.: 18/925,073

(22) Filed: Oct. 24, 2024

(65) Prior Publication Data

US 2025/0045797 A1 Feb. 6, 2025

Related U.S. Application Data

(63) Continuation of application No. PCT/JP2024/001405, filed on Jan. 19, 2024.

(30) Foreign Application Priority Data

Jan. 26, 2023 (JP) ................................ 2023-010062

(51) Int. Cl.

| | |
|---|---|
| ***G06Q 30/0251*** | (2023.01) |
| ***G06V 20/52*** | (2022.01) |
| ***G06V 20/68*** | (2022.01) |

(52) U.S. Cl.
CPC ......... *G06Q 30/0255* (2013.01); *G06V 20/52* (2022.01); *G06V 20/68* (2022.01)

(58) Field of Classification Search
CPC ......... G06Q 30/02–0277; G06V 20/68; G06V 20/52
See application file for complete search history.

(56) References Cited

U.S. PATENT DOCUMENTS

2024/0202804 A1* 6/2024 Morgan ............. G06Q 30/0207

FOREIGN PATENT DOCUMENTS

| | | | | |
|---|---|---|---|---|
| JP | U 3090840 | 12/2002 | | |
| JP | 2007167475 | 7/2007 | | |
| JP | 4181836 B2 * | 11/2008 | | |
| JP | 5722842 B2 * | 5/2015 | ............. | A47F 10/06 |
| JP | 2022059764 | 4/2022 | | |

* cited by examiner

*Primary Examiner* — Raquel Alvarez
(74) *Attorney, Agent, or Firm* — Yusuke Hirai; Best Mode IP Law, PLLC

(57) ABSTRACT

An information processing device includes: an item information acquisition unit that is configured to acquire, based on a detection result by an item detection unit, item information on an item that is conveyed at a position upstream of a target user by a conveying device used in a restaurant to convey items on a conveying path, the item detection unit being configured to detect the items on the conveying path; a determination unit that is configured to determine whether a predetermined notification condition for the item is satisfied based on the item information; and a notification information output unit that is configured to output notification information on the item in association with the target user based on a determination result by the determination unit.

15 Claims, 12 Drawing Sheets

FIG. 4

| USER ID | SEAT IDENTIFIER | VISIT TIME | CHILD | PREFERENCE INFO |
|---|---|---|---|---|
| ... | ... | ... | ... | ... |
| 102...42 | TABLE 2 | 18:45 | YES | CONE, NATTO |
| 212...39 | TABLE 7 | 18:46 | NO | SQUID, SHRIMP |
| 132...76 | COUNTER 11 | 18:49 | NO | TUNA, SALMON ROE |
| ... | ... | ... | ... | ... |

FIG. 5

| ITEM IDENTIFIER | PRICE | TARGET FLAG | GROUP IDENTIFIER |
|---|---|---|---|
| ... | ... | ... | ... |
| TUNA | 220 | 1 | NIGIRI SUSHI |
| YELLOWTAIL | 130 | 0 | NIGIRI SUSHI |
| CROQUETTE | 130 | 0 | SIDE MENUE |
| CAKE | 220 | 0 | DESERT |
| ... | ... | ... | ... |

FIG. 6

| TOOL IDENTIFIER | ITEM IDENTIFIER | ITEM (OPEN/CLOSE STATE) | RELATIVE POSITION |
|---|---|---|---|
| ... | ... | ... | ... |
| 0214 | TUNA | YES | 2350 |
| 1932 | CAKE | YES | 2432 |
| 0043 | TUNA SUSHI ROLL | NO | 2491 |
| 1202 | YELLOWTAIL | NO | 2577 |
| ... | ... | ... | ... |

FIG. 9
700
761
81
SPECIAL CAMPAIGN NOW!
Tuna
might come soon!!
812
30 yen off the normal price!
Good deal now!!!
Back to page

INFORMATION PROCESSING DEVICE, RESTAURANT SYSTEM, INFORMATION PROCESSING METHOD, AND STORAGE MEDIUM STORING PROGRAM

CROSS REFERENCE TO RELATED APPLICATION

This application is a continuation application of International Patent Application No. PCT/JP2024/001405 filed on Jan. 19, 2024, which designated the U.S. and claims the benefit of priority from Japanese Patent Application No. 2023-010062 filed on Jan. 26, 2023. The entire disclosure of the above application is incorporated herein by reference.

TECHNICAL FIELD

The present invention relates to an information processing device, a restaurant system, an information processing method, and a storage medium storing a program that can be used in a restaurant that conveys items to users by a conveying device.

BACKGROUND

Conventionally, in a restaurant that provides sushi and so on, a conveying device having a conveying path is used. The conveying path extends along tables for users. In such a conveying device, by conveying a food or a beverage to the user by placing a plate on which the food or beverage is placed on the conveying path, it is possible to provide the food or beverage to the user.

In addition, there has been known a system where a user places an order for an item using a portable terminal or the like at each seat in a store such as a restaurant, for example.

It should be noted that there has been known a configuration of a food management device for managing a food or a beverage housed in a container on a conveying path.

SUMMARY

In recent years, it is getting important not only to have restaurant visitors (customers) enjoy delicious foods and beverages with peace of mind, but also to have them gain a pleasant and enjoyable visit experience (i.e., improve user experiences). Against this background, efforts to provide new user experiences are required. Conventionally, in restaurants using a conveyance equipment, it was not often for users to receive information on the items conveyed on the conveying paths. If the number of opportunities for users to receive information on the items being conveyed increases, such users would be able to make better item selections and order items, thereby providing the users with comfortable and enjoyable experiences.

The present disclosure has been made in view of the above, and one objective thereof is to provide an information processing device, a restaurant system, an information processing method, and a storage medium storing a program that can appropriately notify the user of information on items that are being conveyed to the user.

In a first aspect of the present disclosure, an information processing device includes: an item information acquisition unit that is configured to acquire, based on a detection result by an item detection unit, item information on an item that is conveyed at a position upstream of a target user by a conveying device used in a restaurant to convey items on a conveying path, the item detection unit being configured to detect the items on the conveying path; a determination unit that is configured to determine whether a predetermined notification condition for the item is satisfied based on the item information; and a notification information output unit that is configured to output notification information on the item in association with the target user based on a determination result by the determination unit.

Accordingly, it is possible to appropriately perform a notification of information items being conveyed to the user.

In a second aspect of the present disclosure, the information processing device according to the first aspect includes a user information acquisition unit that is configured to acquire user information on the target user, wherein the notification condition includes a condition relating to the user information, and the determination unit is further configured to determine whether the notification condition is satisfied based on the user information acquired by the user information acquisition unit.

Accordingly, the notification of the information on items being conveyed can be performed based on the user information.

A third aspect of the present disclosure is the information processing device according to the second aspect, wherein the user information acquisition unit is further configured to acquire preference information, which is related to a preference of the target user and is input in association with the target user, as the user information, and the notification condition includes a condition relating to the preference information.

Accordingly, the notification of the information on the items being conveyed can be performed according to the user's preference.

A fourth aspect of the present disclosure is the information processing device according to the second aspect, wherein the user information acquisition unit is further configured to acquire the user information based on a current order history of items currently ordered by the target user at the restaurant, and the notification condition includes a condition relating to the current order history.

Accordingly, the notification of the information of the item can be performed according to the current order history of the user.

A fifth aspect of the present disclosure is the information processing device according to the second aspect, wherein the user information acquisition unit is further configured to acquire the user information based on a past order history of items previously ordered by the target user, and the notification condition includes a condition relating to the past order history.

Accordingly, the notification of the information of the item can be performed according to the past order history of the user.

A sixth aspect of the present disclosure is the information processing device according to the second aspect, wherein the user information acquisition unit is further configured to acquire the user information based on a predetermined attribute value relating to a state in which the target user visits the restaurant.

Accordingly, the notification of the information of the item can be performed according to the predetermined attribute value relating to the state in which the user visits the restaurant.

A seventh aspect of the present disclosure is the information processing device according to the first aspect, wherein the item information includes an item identifier that identifies a menu of the item or an item group to which the item belongs, and the notification condition includes a condition relating to the item identifier.

Accordingly, the notification of the information of the item can be performed in accordance with the menu of the item or the item group.

An eighth aspect of the present disclosure is the information processing device according to the first aspect, wherein the item information includes information as to whether the item is a predetermined target item, and the notification condition includes a condition as to whether the item is the predetermined target item.

Accordingly, the notification of the information of the item can be performed depending on whether the item is the predetermined target item.

A ninth aspect of the present disclosure is the information processing device according to the first aspect, wherein the notification information output unit is further configured to output the notification information so that a notification based on the notification information is performed to the target user at a predetermined timing prior to a timing at which the item will be conveyed to a predetermined position with respect to a seat of the user.

Accordingly, the notification of the information on the item can be performed at the predetermined timing prior to the timing at which the item will be conveyed to the user's seat.

A tenth aspect of the present disclosure is the information processing device according to the first aspect, wherein the notification information output unit is further configured to output, in association with the user, second notification information for notifying the target user that the item is no longer conveyed when the item detection unit detects that the item is not conveyed at a position upstream of the target user after the notification information on the item was output in association with the target user.

Accordingly, the notification that the item for which the notification of the information was performed will be no longer conveyed can be performed.

In an eleventh aspect of the present disclosure, a restaurant system includes: the information processing device according to the first aspect; a conveying device that is used in a restaurant to convey items on a conveying path; an item detection unit that is configured to detect the items conveyed on the conveying path; and a notification device that is configured to perform a notification based on the notification information at a seat of a target user that is associated with the notification information output from the information processing device.

Accordingly, it is possible to appropriately perform a notification of information items being conveyed to the user.

A twelfth aspect of the present disclosure is the restaurant system according to the eleventh aspect, wherein the notification device is further configured to perform the notification based on the notification information at a predetermined timing prior to a timing at which the item corresponding to the notification information will be conveyed to a predetermined position with respect to the seat of the target user that is associated with the notification information.

Accordingly, it is possible to perform a notification of information on items being conveyed to the user at an appropriate timing.

The information processing device according to the present disclosure can appropriately notify the user of information on the item that is being conveyed to the user.

BRIEF DESCRIPTION OF DRAWING

FIG. 4 is a diagram illustrating an example of user information used by an information processing device.

FIG. 5 is a diagram illustrating an example of item information used by the information processing device.

FIG. 6 is a diagram illustrating an example of status information used by the information processing device.

DESCRIPTION OF EMBODIMENTS

Figure 1:
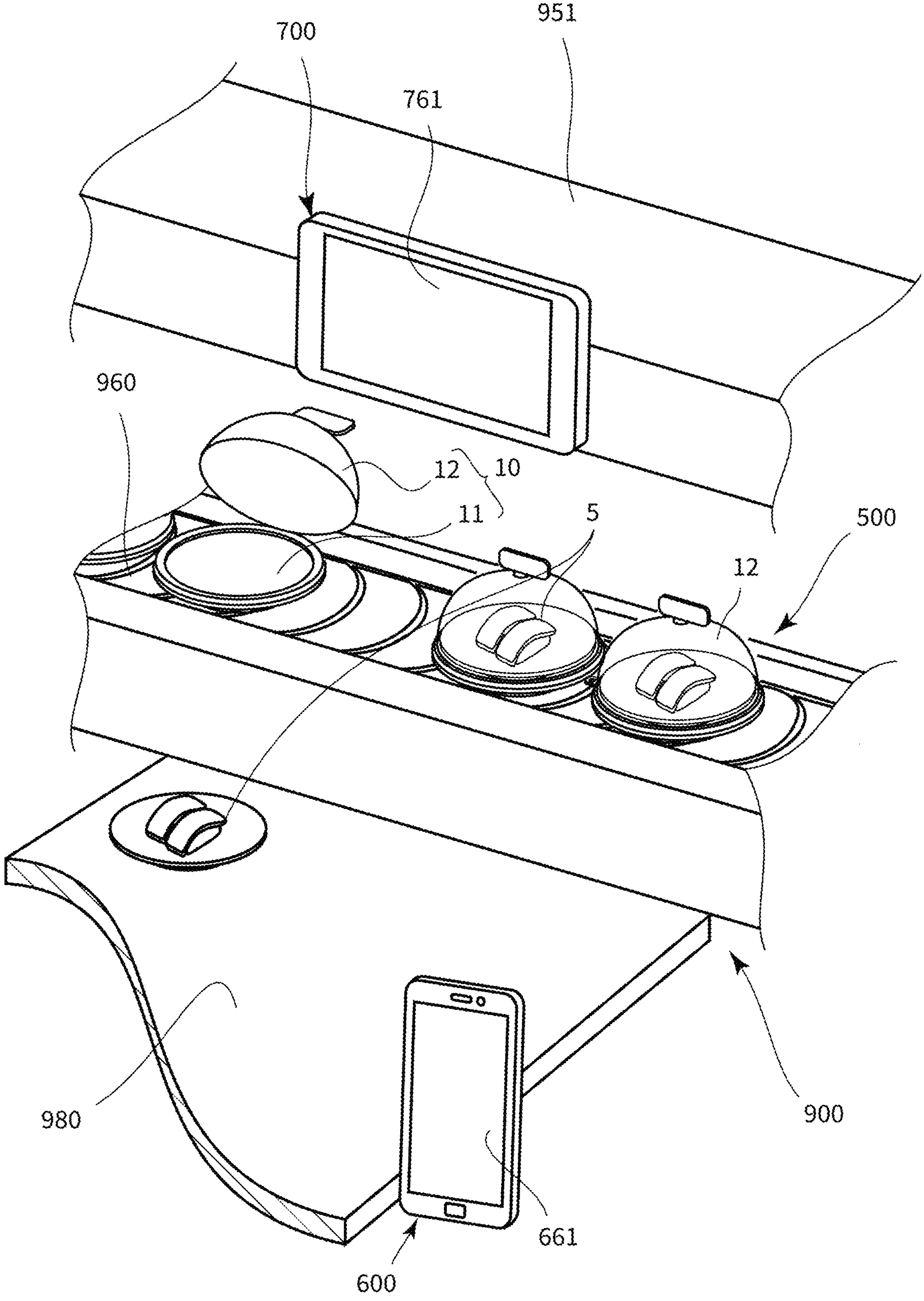
FIG. 1 is a diagram illustrating an example of a conveying device in a restaurant in which a restaurant system in the present embodiment is installed.

Hereinafter, embodiments of an information processing device, etc. will be described with reference to the drawings. In the embodiments, since the components having the same reference numerals perform the same operation, the description may be omitted.

The terms used in the following are generally defined as follows. The meanings of these terms should not always be construed as indicated herein, but should be interpreted in light of their explanations, for example, if they are separately described below.

For a certain matter, an identifier is a character or code that uniquely indicates the matter. The identifier is, for example, an ID, but the type of the identifier does not matter as long as the identifier is information from which the corresponding matter can be identified. That is, the identifier may be the name of the thing itself that it indicates, or it may be a combination of signs or symbols so that they uniquely correspond.

Acquisition may include acquiring matters input by a user or the like, or may include acquiring information stored in another device. Acquiring information stored in the other device may include acquiring information stored in the other device via API or the like, or may include acquiring the contents of document files (including the contents of web pages) provided by the other device. Further, it may include acquiring information in a format different from the original information based on the original information, such as acquiring information by performing optical character reading for the image file.

Further, a so-called machine learning method may be used to acquire information. For example, the use of machine learning methods can be done as follows. That is, a learner (learning information) with a specific type of input information as input and output information of the type to be acquired as output is created using a machine learning method. For example, two or more sets of input information and output information are prepared in advance, the two or more sets of information are given to a module for creating a machine learning learner to create a learner, and the created learner is stored in the storage unit. The learner can also be called a classifier. The machine learning method may be, for example, deep learning, random forest, SVM, or the like. Machine learning may also use functions in various machine learning frameworks such as fastText, tinySVM, random forest, TensorFlow, and various existing libraries. Acquiring information using such a learner is sometimes called acquisition by machine learning.

Further, the learner is not necessarily limited to ones obtained by machine learning. The learner may be, for example, a table showing a correspondence between an input vector based on input information and the like and output information. In this case, output information corresponding to a feature vector based on input information may be acquired from a table. Alternatively, a vector approximating to a feature vector based on input information may be generated using two or more input vectors in the table and a parameter for weighting each input vector may be generated. Then, a final output information may be acquired using the output information corresponding to each input vector used for generation and parameters. Acquiring information using such a learner may be sometimes called acquisition using correspondence. Further, the learner may be, for example, a function representing the relationship between an input vector based on input information or the like and information for generating output information. In this case, for example, information corresponding to the feature vector based on the input information may be calculated by a function, and output information may be acquired using the obtained information. Acquiring information using such a learner may be sometimes called acquisition using a function.

Information output is a concept that includes displaying on a display, projecting using a projector, printing with a printer, sound output, transmission to an external device, storage on a storage medium, delivery of processing results to other processing devices or other programs, and the like. Specifically, for example, enabling images of information on a web page, sending the information as an e-mail or the like, and outputting the information for printing, and the like may be included.

Acceptance of information is a concept that includes acceptance of information input from an input device such as a keyboard, a mice, a touch panel, etc., the reception of information transmitted from another device via a wired or wireless communication line, and the acceptance of information read from a storage medium such as an optical disk, magnetic disk, semiconductor memory, etc.

For various types of information stored in an information processing device or the like, updating is a concept that includes not only changing the stored information, but also adding new information to the stored information, or erasing part or all of the stored information.

(Embodiment)

In the present embodiment, an overview of the information processing device and the restaurant system using the information processing device is as follows. The restaurant system uses a conveying device that is configured to convey items at a restaurant to user who are visitors to the restaurant. The information processing device acquires item information on items that are conveyed at a position upstream of a user, and outputs notification information on the item based on a determination result as to whether a predetermined notification condition is satisfied for the item. Based on the notification information, a device used in the restaurant system performs a notification regarding the item to the user.

The notification condition may include a condition related to user information on the user. For example, the user information may be acquired based on preference information input by the user, a current order history of the user, and a past order history of the user. Then, it may determine whether the notification condition for these pieces of the information are met. Further, the user information may be acquired based on a predetermined attribute value such as a visiting status of the user, and a determination may be made as to whether the notification condition related to the attribute value is satisfied.

The item information may include, for example, information related to a menu or an item group. Further, for example, the item information may be information indicating that the item is a predetermined target item such as an item in the sale. It may determine whether the notification condition for them is met.

Notification based on the notification information may be preferably performed to the user at a predetermined timing prior to the timing at which the item will be conveyed to a predetermined position with respect to the user's seat. If, after the notification information on an item was output, the item is no longer conveyed at a position upstream of the user, another notification may be performed accordingly.

Hereinafter, the information processing device configured in this manner and the restaurant system using the device will be described below.

Figure 2:
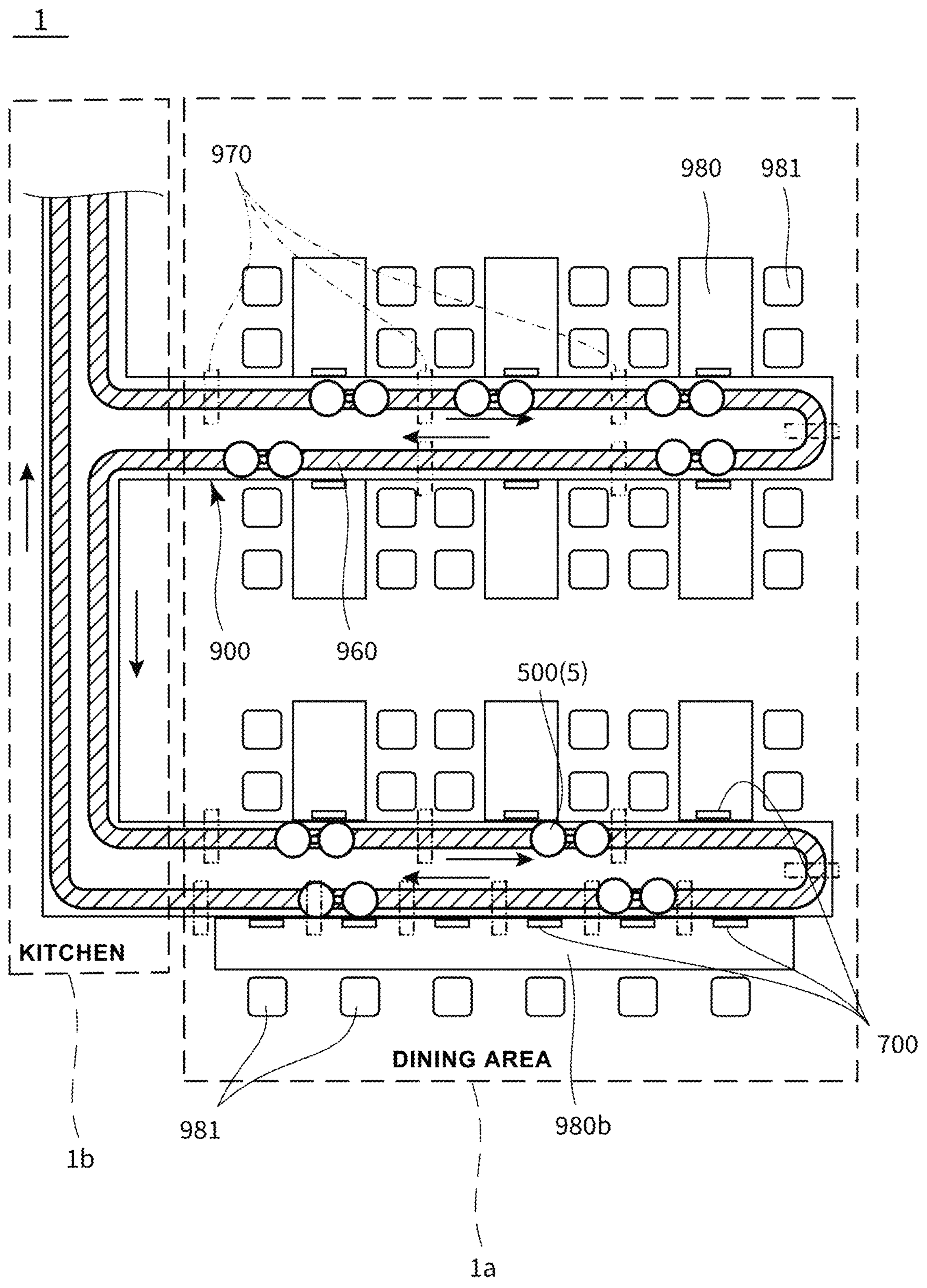
FIG. 2 is a plan view showing an example of the conveying device.

FIG. 1 is a diagram illustrating an example of a conveying device 900 in a restaurant in which the restaurant system 1 in the present embodiment is installed. FIG. 2 is a plan view showing an example of the conveying device 900.

The restaurant system 1 according to the present embodiment is used in a building such as a restaurant or a store, for example. FIG. 1 shows a part of fixtures and the like. FIG. 2 shows an example of the conveying device 900 in a building such as a restaurant. The restaurant may be, for example, a so-called conveyor belt sushi restaurant. The store in which the restaurant system 1 is used may be other types or fields of restaurants. In addition, an item served to a user may be a free item or a paid item.

In the present embodiment, the item is a food, a beverage, or a drink such as sushi, for example. For example, the item may be a dish such as nigiri sushi, hand-rolled sushi, or other dishes. Further, the food and the drink may include a beverage, a confectionery, a containerized food, a packaged food, and the like. Further, the item may be any other item having value than foods and drinks such as gifts, goods, or products.

In the present embodiment, a user who is a visitor to the restaurant can place orders for items at each seat through the restaurant system 1. Further, in the restaurant system 1, the item may be conveyed to a user by the conveying device 900.

Here, "seat" is a concept meaning a seat or table used by a user (a customer) to whom the item is served. One seat corresponds to, for example, a customer group of one or more users who purchase an item (the customer group may include one or more users and may be a single user). For example, when a customer group formed of a plurality of users comes to a restaurant, and the customer group is guided to one table in the store, the one table corresponds to a seat. Further, for example, when a customer group with only one person comes to a restaurant, and the customer group is guided to one counter seat in the restaurant, the one counter seat corresponds to a seat. However, the seat is not necessarily limited to an actual seat or table. The seat may be other things indicating a purchaser, an ordering person/entity, a provider, or the like for the item as corresponding to a group formed of one or more users. Such a seat may be real or virtual. In other words, the "seat" is a concept that indicates a unit to which the item is provided and the price of the item is charged. In the following description, a seat corresponding to such a user (the customer group) may simply be referred to as a user. That is, when an item is provided to a seat corresponding to a user (a customer group), it may be simply expressed as "an item is provided to a user".

The restaurant system 1 includes a conveying device 900, an information processing device 100, and notification devices 700 each of which is a reception terminal disposed in a corresponding seat. Further, it may be interpreted that the restaurant system 1 has a terminal device 600 capable of communicating with the information processing device 100 via a network, for example. That is, customers of a restaurant receive services from the restaurant system 1 using terminal devices 600 or the like. It should be noted that the restaurant system 1 may be used by a manager of the restaurant or the like who makes various settings to the system 1.

In the present embodiment, one customer group can order items or the like using the notification device 700 that is disposed at the seat for the group. The notification device 700 has a notification display 761 that is a screen such as a touch panel. Note that the customer group may also order items using one or more terminal devices 600 owned by the group. In this case, for example, a configuration of the restaurant system as described in JP2021-015529A, which is incorporated herein by reference, may be used.

In FIG. 1, for example, a portable information terminal device such as a so-called smartphone is shown as the terminal device 600. The terminal device 600 includes a terminal display 661 that is a screen such as a touch panel. Alternatively, a personal computer (PC) such as a tablet-type information terminal device and a laptop computer may be used as the terminal device 600. Furthermore, although a tablet-type information terminal device is used as the notification device 700, a portable information terminal device, a personal computer (PC), or the like may also be used as the notification device 700.

In the restaurant system 1, devices can communicate with each other via a network such as, for example, a local area network or the Internet, but are not necessarily limited thereto. The number of the devices in the restaurant system 1 may not be limited, and other devices may be used in the restaurant system 1.

The conveying device 900 is provided between a dining area 1*a* for users to eat and drink and the kitchen 1*b*. In the dining area 1*a*, for example, tables 980 and seats 981 are provided for users to eat and drink. As a table 980, a counter table 980*b* at which users in a row can eat and drink may be used.

The conveying device 900 includes a conveying path 960 on which plates are conveyed. An item 5 such as sushi is placed on the plate. The conveying path 960 is laid in the dining area 1*a* so that plates are conveyed along the tables 980. The conveying path 960 is formed using, for example, a crescent chain having a flat upper surface, but is not limited thereto. The conveying path 960 is configured to convey the plates in a predetermined conveying direction (indicated by an arrow in FIG. 2) and to circulate the plates between the kitchen 1*b* and the dining area 1*a*. That is, the conveying path 960 conveys plates with sushi or the like, which is an item 5, from the upstream side to the downstream side. When viewed from a certain point on the conveying path 960, the upstream is a side where the item 5 is approaching, and the downstream is a side where the item 5 is moving away.

In the conveying device 900, an upper unit 951 is disposed above the conveying path 960. The upper unit 951 is provided with a lighting device, and is configured to emit light downward to illuminate the conveying path 960. The notification device 700 is disposed in the upper unit 951. In the restaurant system 1, using a so-called electronic menu displayed by the notification device 700, a user at a seat can place an order for the item 5 or the like. For such a configuration for accepting an order for the item 5, a publicly-known method can be used, for example. For example, the information processing device 100 accepts an order from each seat based on a user's order operation onto the notification device 700 or the like at the seat, and transmits the contents of the order to a terminal or the like provided in the kitchen 1*b* (not shown).

In the present embodiment, the notification device 700 and the terminal device 600 receive information output (transmitted) from the information processing device 100, and based on the received information, the notification display 761 and/or the terminal display 661 display information or the like. The notification device 700 and the terminal device 600 display information or the like based on notification information when the notification information is input into the notification device 700 and the terminal device 600. Note that the notification device 700 and the terminal device 600 are capable of outputting audio sound, light, and the like, and may output audio sound, light, or the like based on the output notification information. Displaying of information based on such notification information or outputting of the audio sound or light may be described as notification based on the notification information.

Here, in the present embodiment, an item 5 is provided to a user using a container 10. The container 10 is placed on the conveying path 960. The container 10 includes a base 11 on which a plate with an item 5 is placed and a lid 12 configured to cover an upper surface of the base 11. The plate on which the item 5 is placed is conveyed on the conveying path 960 while being covered by the lid 12 of the container 10. By opening the lid 12 of the container 10, each user can pick up the conveyed item 5 together with the plate and move the item 5 on the table 980 for eating. The container 10 from which the item 5 was removed remains in the open state with the lid 12 being opened and is conveyed to the kitchen 1*b* by the conveying path 960.

As a container 10, the container described in JP 5722842 B2, which is incorporated herein by reference, may be used. In the present embodiment, two items 5 may be conveyed together by the conveying path 960 as a connecting body 500 in which the two containers 10 are connected to each other. However, a providing method is not necessarily limited to this.

However, not necessarily limited the above, a plate or the like on which the item 5 is placed may be directly placed on the conveying path 960 without using the container 10 and is served.

In the present embodiment, the restaurant system 1 includes item detection units 970 for detecting items 5 being conveyed on the conveying path. In this embodiment, the item detection unit 970 performs a detection relating to the item 5, for example, by detecting the container 10 in which the item 5 is housed. Alternatively, the item detection unit 970 may directly detect the item 5.

The item detection unit 970 is, for example, a sensor or the like for detecting the item 5 on the conveying path 960. The sensor may be, for example, a camera that acquires an image, a contact sensor, a non-contact sensor such as a photoelectric sensor or a proximity sensor, or a reader capable of reading an RF tag (IC tag), but is not limited thereto, and two or more sensors among them may be used together. Further, the item detection unit 970 may detect the items 5 using, for example, information such as a database stored in the information processing device 100 or other devices such as a computer, or information input by a staff or the like of the restaurant. The item detection unit 970 may function using both a sensor provided on the conveying path 960 and a device such as the information processing device 100 or other computers, or may perform detection related to the items 5 using the information processing device 100 or the like without a sensor.

As the detection related to the item 5, information related to identification of the item 5, information related to the state of the item 5, and the like may be acquired.

Information related to the identification of the item 5 is, for example, an attribute value for identifying each item 5 and an attribute value for specifying a type of the item 5 (such as a menu name or a category to which the item 5 belongs). Examples of such attribute values include an identifier for identifying each plate or each container 10 housing the item 5, an identification result of a serving manner when the item 5 is served in a particular manner, and information based on an image of the item 5 (the information may be the image itself, or may be a feature quantity that is acquired from the image). That is, detecting information related to the item 5 may be described as identifying information related to the item 5.

Information related to the state of the item 5 is, for example, information indicating the state of the item 5 and information used to recognize the state of the item 5. The state of the item 5 is, for example, the position of the item 5, the presence or absence of the item 5, the elapsed time since the item 5 was set on the conveying path 960, and the like, but is not necessarily limited them. The position of the item 5 may be, for example, a relative position on the conveying path 960, or the absolute position of the item 5 in the restaurant 1, that is, the position of the item 5 with respect to each user. When the relative position on the conveying path 960 (the position of the item 5 from the starting point on the conveying path 960) can be acquired, the relative position may be detected as information used to detect the state of the item 5. That is, based on the relative position and the position of the conveying path 960, it is possible to acquire the absolute position of the item 5. As the information on the presence or absence of the item 5, information indicating that the item 5 which was detected is not detected at a timing may be acquired. Also, information indicating that the container 10 housing the item 5 is opened may be acquired. These information can be described as indicating that the item 5 was picked up by a user or the like (i.e., a customer) from the conveying path 960. The state of the item 5 may be described as the serving state of the item 5.

The item detection unit 970 is configured to detect each of two or more items 5 being conveyed on the conveying path 960 to acquire information related to the items 5.

As the item detection unit 970, for example, an open/close detector and a reader as described in JP5722842B, which is incorporated herein by reference, may be used. In this case, for example, an RF tag unique to the container 10 is provided, and information read by the reader can be used as information related to the identification of each item 5. The state of the container 10 can be detected using the open/close detector and may use the state of the container 10 as information on the state of the item 5.

In the present embodiment, each of the open/close detectors of the item detection unit 970 is disposed between the seats (between the tables 980 or between the seats 981 of the counter table **980*b*) to detect the open/close state of the container 10. That is, the item detection unit 970 identifies a section of the conveying path 960 corresponding to the seat at which the container 10 is opened, in other words, at which the item 5 is picked up from the conveying path 960. However, not necessarily limited to the above, the open/close detectors may be disposed to be spaced away from each other with predetermined intervals on the conveying path 960, or the open/close detectors may be arranged at certain locations according to the layout of the restaurant or the like. That is, the item detection units 970 are disposed at two or more locations on the conveying path 960 to detect that the item 5 which was conveyed is no longer present on the conveying path 960**.

Note that the item detection units 970 are not limited to those using such an open/close detector or a reader for an RF tag. For example, an image acquired by capturing the conveying path 960 by a camera may be used to detect the open/close state of the container 10, or may be configured to acquire attribute values relating to the type of items 5 and the like. In this case, for example, a two-dimensional code forming an identifier is attached to the container 10, and the reading result of the two-dimensional code may be used to detect information related to the item 5. Further, the item detection unit 970 may be configured to acquire an absolute position of the item 5 based on the position at which the item 5 is placed on the conveying path (i.e., the relative position of the item on the conveying path 960) and the position of the conveying path 960.

Figure 3:
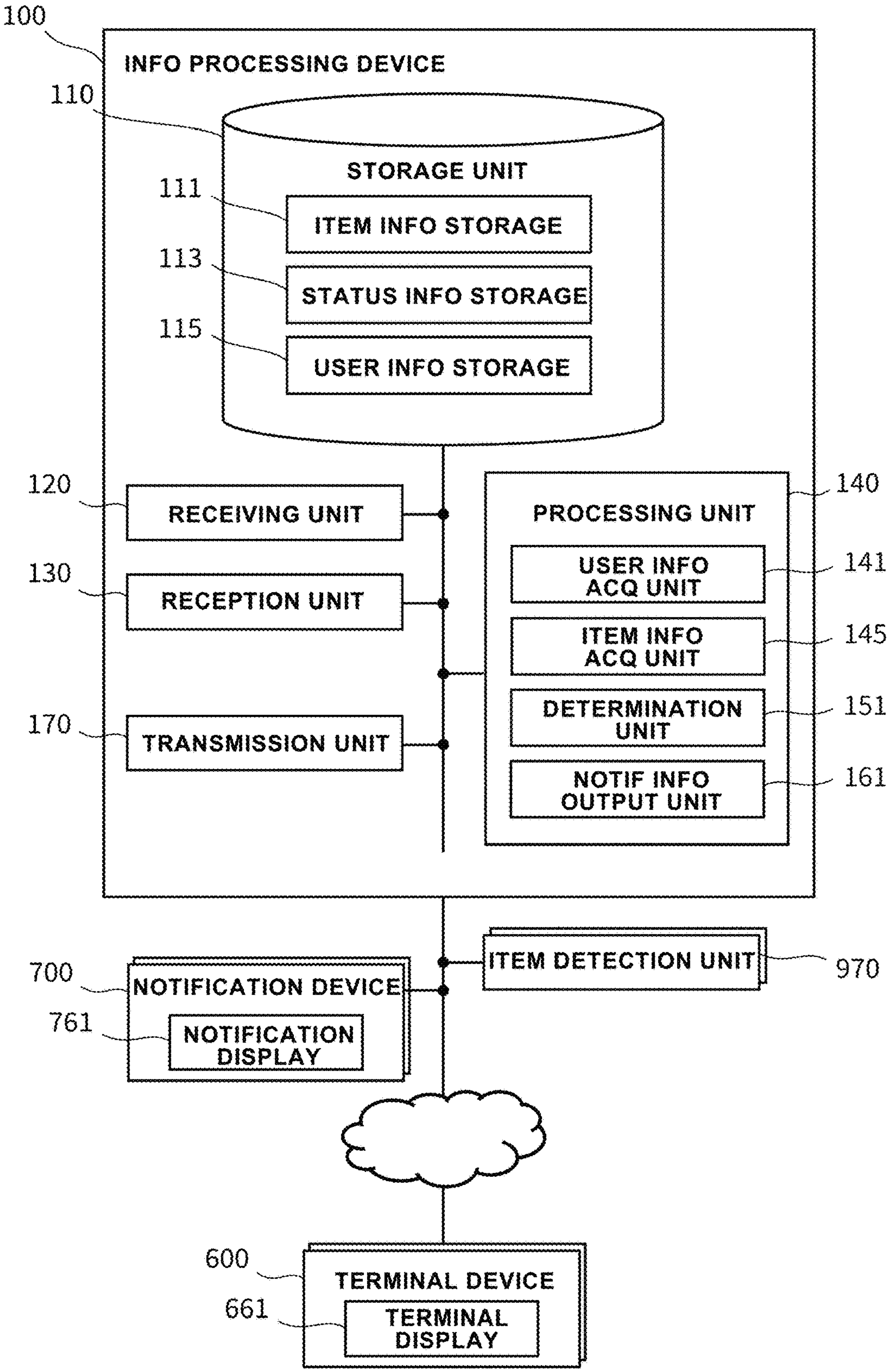
FIG. 3 is a block diagram of the restaurant system.

FIG. 3 is a block diagram of the restaurant system 1.

As shown in the figure, the information processing device 100 includes a storage unit 110, a receiving unit 120, a reception unit 130, a processing unit 140, and a transmission unit 170.

The storage unit 110 includes an item information storage unit 111, a status information storage unit 113, and a user information storage unit 115.

The storage unit 110 may be preferably a non-volatile storage medium, but may also be a volatile storage medium. A plurality of pieces of information acquired by each device and the like are stored in the storages 112,115, but the process of storing information and the like is not necessarily limited to this. For example, information or the like may be stored via a storage medium, information transmitted via a communication line or the like may be stored, or information input via an input device may be stored.

The item information about the item 5 is stored in the item information storage unit 111. The item information is a variety of attribute values for an item, such as, an identifier for identifying the item, the name of the item, information about the price of the item, etc.

In this embodiment, the item information includes, for example, an item identifier for identifying a menu of the item 5. For example, it is assumed that there are various types of sushi (e.g., "tuna," "yellowtail," salmon roe," "tamago," etc.), as well as beverages (e.g., "bottled beer (large)," "bottled beer (small)," "oolong tea," "orange juice," "drink bar"), side menus (e.g., "croquette," "pickles"), desserts (e.g., "pudding," "vanilla ice," "strawberry"), etc. In this case, as the item identifier, identifiers such as "tuna," "yellowtail," "oolong tea," and "croquette" may be used. Note that the item information may include the item identifier that identifies an item group to which the items 5 belong. In this case, item groups such as "sushi", "beverage", or "side menu" may be used as the item identifier. It should be noted the item identifier is not necessarily limited to the above-described identifier, and may be a code sequence that has no meaning itself. Further, the item group may also be identified by an identifier that is different from the item identifier.

In the present embodiment, the item information includes information as to whether the item 5 is a predetermined target item. The predetermined target item means, for example, an item applicable to promotional campaign, an item applicable to sale, or other items that are specially provided. The information as to whether the item is the predetermined target item, may be, for example, information such as a flag that is associated with the item identifier of each item 5 and indicates that the item is the predetermined target item. It should be noted that the predetermined target item may be changed as appropriate. For example, depending on various factors such as season, time zone, weather, nature of the customer group (e.g., the number of visits, the number of people, age, sex, etc.), the number of items in the inventory, the degree of congestion in the restaurant, etc., the predetermined target item may be set by the processing unit 140 or the like in accordance with a predetermined setting rule or the like, or may be set in accordance with information transmitted from another management device capable of communicating through the network. Further, information indicating that any of items 5 is not the predetermined target item may be stored as the item information.

The status information storage unit 113 stores status information related to the status of each of the items 5 that are being conveyed on the conveying path 960 in the restaurant. The status information includes, for example, information on the location of each item 5 on the convey path 960 and information on the status of each item 5. The status information may be updated as appropriate depending on, for example, the detection results by the item detection unit 970.

In this embodiment, information indicating a relative position of each of the containers 10 on the conveying path 960 and information as to whether an item 5 is hosed in each of the containers 10 are stored, as circumstantial information, in association with an identifier for identifying each of the containers 10. As the information on whether the item 5 is housed in the container 10, the detection result as to whether the container 10 is opened or closed can be used.

In this embodiment, each of the containers 10 is associated with a menu of the item 5 housed by the container 10. That is, each container 10 is associated with the item identifier of the item 5 housed by the container 10. Specifically, the container 10 for "tuna" and the container 10 for "yellowtail" are prepared in advance. Then, the item 5 of "tuna" and the item 5 of "yellowtail" are each housed in the respective containers 10 and are conveyed on the conveying path 960. Therefore, it is determined whether the item 5 identified by the corresponding item identifier is conveyed while being housed in the container 10 based on the identifier (hereinafter, may be referred to as a "tool identifier") for identifying the container 10 and a detection result as to whether the container 10 is opened or closed.

However, the status information is not necessarily limited to the above-described information. For example, when the respective items 5 and their positions on the conveying path 960 can be detected by the item detection unit 970 or the like, such information may be stored as the status information. Furthermore, the container 10 may not necessarily be associated with a particular item 5 in advance as described above. That is, the tool identifier of the container 10 and the item identifier of the item 5 housed in the container 10 may be associated with each other when the item 5 is housed in the container 10 and placed on the conveying path 960. For example, it is assumed that an identifier member such as a display member (e.g., an advertising POP) that can identify the item identifier of an item 5 and the container 10 that is not associated with that item 5 are placed and conveyed on the conveying path 960 in a manner of satisfying a predetermined condition, it is possible to determine that the item identifier and the tool identifier of the container 10 are associated with each other. In this case, the predetermined condition may include a condition that the distance between the identifier member and the container 10 on the conveying path 960 is within a predetermined distance, a condition that the number of the containers 10 that are arranged after the identifier member is equal to or less than a predetermined number (e.g., one, two, or three), a condition that the container 10 is a container that directly follows the identifier member without intermediate objects (i.e., other identifier members). The container 10 that is associated with an item 5 in advance may be used as the identifier member. Further, a restaurant manager or a staff may register the relationship between the tool identifier and the item identifier in the information processing device 100 or the like when the manager or the staff places the container 10 on the conveying path 960.

The user information storage unit 115 stores user information related to each of users who uses the restaurant system 1. In the present embodiment, the user information is information in which a user identifier, which is an identifier for identifying the user who uses the restaurant system 1, is associated with information on the user. The user information may include various information. For example, the user information is accumulatively stored in the user information storage unit 115 by being received by the receiving unit 120, by being received by the reception unit 130, or by being acquired as a result of information processing executed by the processing unit 140.

In the present embodiment, the user information may include a predetermined attribute value related to a state in which the user visits the restaurant. The predetermined attribute value may be, for example, information such as the number of people in the customer group who are users, the time of visit (may be the elapsed time since the customer group visited the restaurant), etc., but is not necessarily limited thereto. Information such as the number of adults and children in the customer group may be also included.

Further, in the present embodiment, the user information may include preference information that is information about the user's preference, which is input in association with the user. The preference information is, for example, information based on information input by the user via the terminal device 600 or the notification device 700, but is not necessarily limited thereto. The preference information is, but is not necessarily limited to, information indicating a user's preference on, for example, menus, flavors, item groups, and a serving manner of the item 5. The preference information may be information acquired based on, for example, a user's order history or the like. For example, the preference information may be information about a user's preferred eating and drinking method or the like. The eating and drinking method is not necessarily limited, but, for example, the order of the menu to eat and drink, the eating speed of the items in one meal opportunity, etc.

Further, the user information may include, for example, information on the order history of the items 5. For example, order information indicating an ordering status for each seat and consumption information indicating a consumption status of the items 5 for each seat may be included as the user information.

The order information is, for example, information related to the order of items, and information including seat specifying information for specifying a seat. The order information has, for example, an item identifier for uniquely identifying the item. The order information includes, for example, an item identifier and the number of orders. The order information may include, for example, the item identifier and a price. The order information may be, for example, information indicating that a plate on which the item 5 is placed is served (provided) to the customer group. In other words, the order information may include information subsequent to the order.

The consumption information is information related to the amount or quantity of the items 5 consumed by a user. In the present embodiment, the consumption information is, for example, the price of the item 5 consumed by the user, but is not necessarily limited thereto. The number of items 5 consumed by the user may be used as the consumption information. In the present embodiment, the item 5 with a predetermined unit is placed on a plate and served to the user. In this case, the number of plates of the items 5 consumed by the user may be used as the consumption information.

In addition, as information related to the order history such as the order information and the consumption information, information related to the order history at the user's current eating occasion (hereinafter, referred to as a "current order history") may be included in the user information. That is, the current order history is an order history of items that are currently ordered by the user.

Further, in the present embodiment, the user information stored in the user information storage unit 115 is not necessarily limited to the information acquired with respect to the current eating and drinking opportunity, and may include information on a past order history of items that were previously ordered by the user.

Further, for a user, not only the user information acquired in the restaurant visited this time, but also the user information acquired in the occasion of visiting another restaurant in the past may be used. For example, the user information may include information about the order history of items that were ordered by the user in another restaurant different from the restaurant. For example, the user information including the order history by the user in various restaurants and the preference information that has been acquired may be managed, in association with the user account of the user, by other server devices, etc., with which the information processing device 100 is able to communicate In this case, at the timing of visiting to the restaurant by the user, the user information managed in such a server device may be acquired by the information processing device 100 and stored in the user information storage unit 115.

Such information on the order history may be stored, for example, for each user belonging to a customer group.

It should be noted that when the user is in the restaurant, the user information can be described as information about the seat corresponding to the user. That is, in the present embodiment, the user information based on information transmitted from a terminal operable by the user, such as the terminal device 600 and the notification device 700, may be stored in association with seat specifying information such as a seat identifier for specifying a seat and a terminal identifier for identifying the terminal device 600.

In the present embodiment, notification record information indicating that the seat or user has been notified by the notification function as described below may be stored as the user information in association with the user identifier or the seat specifying information. The notification record information is, for example, flag information stored in response to a notification being performed upon arrival of a particular item 5 (the container 10). However, the notification record information is not necessarily limited to this, and may be information in various forms. As the notification record information, for example, a monitor flag and the like that is set (or maintained) until the item 5 for which the notification was performed arrives the user may be used. With such notification record information, it is possible to determine whether the item 5 is an item for which a notification was performed. The notification record information may be described as, for example, the status information.

The receiving unit 120 receives information transmitted from other devices. The receiving unit 120 may be wireless or wired communication means, but may be means of receiving a broadcast.

The receiving unit 120 stores the received information in the storage unit 110, for example. In the present embodiment, the user can input information using the terminal device 600 and transmit the information to the information processing device 100, for example. The receiving unit 120 stores each transmitted information in the storage unit 110 by associating the information with the terminal identifier or the seat identifier. In the present embodiment, the receiving unit 120 receives the order information transmitted from each terminal device 600 and the notification device 700, associates the information with the terminal identifier or the seat identifier, and stores the information in the storage unit 110. When receiving information from the notification device 700, the receiving unit 120 specifies, based on the transmitted information, the seat identifier for identifying a seat having the notification device 700. Further, when the receiving unit 120 receives information from the terminal device 600, the receiving unit 120 specifies, based on the transmitted information, the terminal identifier that identifies the terminal device 600 which transmitted the information.

The reception unit 130 accepts information input via input means (not illustrated) connected to the information processing device 100. The reception unit 130 stores the received information in the storage unit 110, for example. The input means may be anything, such as a numeric keypad, a keyboard, a mouse, or a menu screen. The reception unit 130 may be a device driver for input means such as a numeric keypad or a keyboard, control software for a menu screen, or the like. The reception unit 130 may receive information input by an input operation using a reading device (for example, a code reader, etc.) connected to the information processing device 100. The information may include, e.g., information read by the reading device.

In other words, the reception unit 130 accepts the information received by the receiving unit 120 as information input into the information processing device 100. That is, the input of information into the information processing device 100 may be interpreted that this information is indirectly input into the information processing device 100 by the user via the notification device 700, the terminal device 600, or the like.

The processing unit 140 performs various processes. Various processes include, for example, processes performed by each portion of the processing unit 140 as described below. The processing unit 140 may include an MPU, a memory, or the like. The processing by the processing unit 140 is usually realized by software, and the software is stored on a storage medium such as ROM. However, the processing may be also realized by hardware (e.g., by a dedicated circuit).

In the present embodiment, the processing unit 140 is configured to perform a notification function for notifying a user who is using the restaurant that the item 5 being conveyed on the conveying path 960 will approach the user. Such notification function is realized by a user information acquisition unit 141, an item information acquisition unit 145, a determination unit 151, and a notification information output unit 161 in the processing unit 140. Each of the processing unit 140 may perform the following processing for each target user.

The user information acquisition unit 141 acquires the user information that is information on a user who uses the restaurant, that is, a target user. For example, the user information acquisition unit 141 acquires the user information corresponding to the user identifier that identifies the target user from the user information storage unit 115. The user information acquisition unit 141 may acquire the user information based on other information. In this case, the user information acquisition unit 141 may be configured to accumulatively store the user information in the user information storage unit 115. In this case, the accumulation of the user information may be temporarily performed.

In the present embodiment, the user information acquisition unit 141 acquires, as the user information, the preference information which is information related to the user's preference, for example, which is input in association with the target user.

Further, the user information acquisition unit 141 acquires the user information based on a predetermined attribute value relating to a state in which the target user visited the restaurant. The predetermined attribute value is an attribute value as described above. For example, the user information acquisition unit 141 is configured to acquire the attribute values such as the number of the customer group and visit time based on information such as the number of the customer group input into the information processing device 100 by a staff of the restaurant or the user who visited the restaurant.

Further, the user information acquisition unit 141 acquires the user information based on the current order history of the items 5 by the target user. The user information acquisition unit 141 may acquire the user information based on the past order history of the items 5 by the target user. As the user information based on the order history, the order history itself such as order information and consumption information stored in the user information storage unit 115 may be acquired. Further, as the user information, information about the behavior or the consumption trend of the user acquired based on the order history may be acquired. For example, based on the past order history, information on the amount of consumption, such as the number of the items 5 consumed on a single eating occasion, the amount of consumption, such as the amount of a nutritional index (such as the amount of heat (i.e., calories)) of the items 5 consumed on a single eating occasion, information on the total amount of paid fees or an average price of consumed items 5 in a restaurant, information on the time of staying in a restaurant on a single eating occasion, and information on menus such as items 5 consumed frequently (or items 5 not consumed at all) and item groups may be acquired as the user information. Further, based on the current order history, information on a difference between a predetermined reference number or reference paid amount of items 5 and the actual consumed number or amount may be acquired as the user information.

The item information acquisition unit 145 acquires the item information related to the item 5 conveyed at a position upstream of the target user by the conveying device 900. The item information acquisition unit 145 acquires the item information on the item 5 conveyed at a position upstream of the target user based on the detection result of the item detection unit 970. The item information acquisition part 145 acquires the item information at a predetermined processing timing, for example. The predetermined processing timing may be a timing at which a predetermined time has arrived, a timing at which a predetermined time has elapsed since the previous processing has been executed, a timing at which a predetermined operation is performed by a user or the like, or a timing at which a predetermined change in the state of the user or the like occurs, but not necessarily limited thereto. The item information acquisition unit 145 identifies the item 5 that is conveyed at a position upstream of the target user based on the status information acquired at the predetermined processing timing, and then acquires the item information pertaining to the identified item 5. In this case, information stored in the status information storage unit 113 at the predetermined processing timing may be used as the status information, but is not necessarily limited thereto.

Specifically, for example, the item information acquisition unit 145 acquires the item information related to the item 5 being conveyed within a predetermined range on the conveying path 960 at the predetermined processing timing. The predetermined range, for example, of the conveying path 960 may be a range defined between a predetermined first point and a predetermined second point that is downstream of the predetermined first point. Such locations and a range are absolute locations or range in view of the seats. In this embodiment, both the first point and the second point are located upstream of the target user, i.e., the position of the seat used by the target user (the position of the table 980 or the seat 981, etc.). However, the second point may be located downstream of the seat when viewed from the seat. Such a predetermined range is defined for each seat, i.e. for each target user, and thus can be described as a range corresponding to each seat. The method of setting the predetermined range (e.g., the distance from the seat of the first point or the second point) may be changed for each seat or each user.

The determination unit 151 determines whether a predetermined notification condition is satisfied for the item 5 based on the item information acquired by the item information acquisition unit 145. The notification condition may be set as appropriate. In this embodiment, the notification condition includes, for example, a condition relating to the user information. That is, the determination unit 151 is configured to determine whether the notification condition is satisfied based on the user information acquired by the user information acquisition unit 141. As a notification condition, for example, a condition specifically set to each of the user identifiers may be used. On the other hand, a common notification condition for all users may be used. As the notification condition, two or more conditions may be used, and also a combined condition of the two or more conditions may be used.

More specifically, the notification condition may include, for example, a condition relating to the preference information (e.g., "tuna", "shrimp", "gunkan-maki", "shellfish", "fried fish", etc.). Furthermore, the notification condition may be, for example, a condition as to whether the item 5 is a predetermined target item (e.g., a flag indicating that the item is a target item such as a target applicable to sales promotion campaign is set). The notification condition may also be, for example, a condition relating to the user's order history (e.g., a condition that the user has not yet ordered the item at this time, a condition that the user has already ordered the item more than a predetermined number of times within a predetermined period of time, etc.).

For example, the notification condition may be a condition relating to a predetermined one or more items among two or more items. The notification condition may be, for example, information including an item identifier that identifies an item which is a notification target or information including an item identifier that identifies an item that is not a notification target.

For example, the notification condition may include information relating to a predetermined attribute value. For example, a condition that a predetermined time has not yet elapsed since the target user started eating (or the target user visited the restaurant), a condition that the user (i.e., the customer group) includes a child with an elementary school age or less, or a condition that it is a predetermined time may be included in the notification condition.

In this embodiment, the determination unit 151 may be configured to perform a determination on the items 5 on which the item information was acquired. However, not necessarily limited thereto, the determination unit 151 may perform a determination on only the items 5, which satisfy a predetermined condition, among the items 5 on which the item information was acquired. In this case, the predetermined condition may be interpreted as included in the notification condition.

The notification information output unit 161 outputs notification information regarding the item 5 in association with the user based on the determination result of the determination unit 151. For example, when the determination unit 151 determines that the notification condition is satisfied, the notification information output unit 161 outputs the notification information related to the corresponding item 5 in association with the user.

In the present embodiment, the notification information is, for example, information for notifying the target user that the item 5 for which the notification condition is satisfied will be conveyed to the target user (the seat) shortly. That is, by notifying the user based on the notification information, the user can notice that the item 5 will reach the seat shortly, and attention can be directed to the item 5 being conveyed. Accordingly, it is possible for the user to make a decision by considering in advance whether to purchase the item 5 being conveyed (i.e., the user can determine whether to pick up the item 5 from the conveying path 960 in advance). Therefore, it is possible to appropriately select the item, and the experience in eating and drinking opportunities can be enriched.

Here, "the notification information is output in association with the user" may include, for example, transmitting the notification information to the notification device 700 or the terminal device 600 used by the target user. By outputting in this manner, the notification can be appropriately performed by the notification device 700 and the terminal device 600 corresponding to the target user. However, "the notification information is output in association with the user" may not necessarily limited to the above, and may include "transmitting the notification information to a predetermined device in association with the user identifier for identifying the target user" or "storing the notification information in the storage unit 110 in association with the user identifier for identifying the target user".

The notification information output in this manner includes, for example, the following content information. For example, it is assumed that the notification condition is a condition that the item is a predetermined campaign target item. When such a notification condition is satisfied, the notification information including information indicating the item 5, information indicating that the item is the campaign target item, and information indicating that the item 5 will be conveyed to the target user shortly is output to the target user. The information indicating the item 5 may be, for example, a menu (the name of the item), an image showing the item 5 in a photograph or a diagram, or the price thereof. Also, the information indicating that the item 5 will be conveyed shortly may be, for example, information including a message "the item 5 will come soon.", information indicating an expected time required for the item 5 to reach the target user, or information indicating the distance to the item 5. By outputting the notification information including such information, the notification device 700 and the terminal device 600 can perform a notification appropriately to the target user.

It should be noted that the notification information may not include the content information as described above, and may include instruction information for instructing the notification device 700 or the terminal device 600 to perform the notification. For example, the notification device 700 or the terminal device 600 may in advance acquire the content information to be notified to users. In this case, information specifying which content information to be displayed by the devices 700, 600 may be included in the notification information and output the notification including such information to the devices 700, 600. Accordingly, the notification device 700 or the terminal device 600 can perform a notification to a user using the content information acquired based on the notification information output in this manner.

However, the information indicating the item 5 and the information indicating that the item is the campaign target item may not be included in the notification information. For example, without specifying or suggesting which item 5 is being conveyed, information indicating that the item 5 to which the user should pay attention will be conveyed shortly may be included in the notification information and output the notification information. By outputting the notification information in this manner, it is possible to inform the user of the arrival of the item 5 which the user should consider to purchase.

In this embodiment, the notification information output unit 161 is configured to output the notification information so that the notification based on the notification information is performed to the user at a predetermined notification timing prior to the timing at which the item 5 is conveyed to a predetermined position with respect to the user seat. "Outputting the notification information so that the notification is performed at the predetermined notification timing" may include "outputting the notification information at the notification timing" or "outputting the notification information including information indicating the notification timing at a timing prior to the notification timing". For example, when a notification is performed by the notification device 700 or the terminal device 600 and the notification information is output at the notification timing, the notification device 700 or the terminal device 600 may immediately perform the notification using the output notification information. Further, when the notification information including the information indicating the notification timing is output, the notification device 700 or the terminal device 600 may perform, based on the information indicating the notification timing, a notification when the notification timing actually comes.

The predetermined notification timing may be various timings. For example, the predetermined notification timing is a timing a predetermined time before the item 5 will be conveyed to the seat or a timing at which the item 5 reaches a point on the conveying path to which the seat has a predetermined distance.

In this embodiment, when the notification information on an item 5 is output in association with the user, the notification information output unit 161 is configured to output second notification information in association with the user when the item detection unit 970 detects, at a position upstream of the user, that conveyance of the item 5 is no longer conveyed. The second notification information is information about the fact that the item 5 on which a notification that the item will come soon has already been performed is not conveyed. The second notification information may be described as information for notifying the user that the already notified item 5 will no longer come. The fact that the item 5 is no longer conveyed is, for example, a fact that the item 5 has been taken out from the conveying path 960 by someone. Specifically, the item 5 is no longer conveyed when another customer or a staff, who is located upstream of the target user, picks up the item 5 from the conveying path 960.

The second notification information may be output when, for example, a change in the status as to whether the item 5, on which the notification has been performed, is present (in other words, the item 5 is not present) is detected based on the status information. By performing such a notification based on the second notification information to the user, the user can notice that the item 5, on which the notification that the item 5 will come soon has been performed, no longer reaches the user.

The transmission unit 170 transmits information to another device via a network or the like. The transmission unit 170 transmits information to, for example, the notification device 700 and the terminal device 600. In other words, the transmission unit 170 outputs information to, for example, the notification device 700 and the terminal device 600.

Note that the transmission unit 170 may be wireless or wired communication means, but may also be broadcasting means.

In this embodiment, when the notification information output unit 161 outputs the notification information, the transmission unit 170 transmits the notification information to the notification device 700 or the terminal device 600 used by the corresponding user, for example. Then, the notification device 700 or the terminal device 600 displays a notification based on the notification information on the notification display 761 or the terminal display 661. Accordingly, the user can recognize the notification based on the notification information.

The user information, the item information, and an example of the status information used in the present embodiment are as follows.

FIG. 4 is a diagram illustrating an example of the user information used by the information processing device 100.

In the example shown in the figure, attribute values such as seat identifiers, visit time, information as to whether a child is included, and preference information are stored, as the user information, in association with user identifiers (user IDs) that identify the user information. For example, the seat specifying information may include a seat identifier such as a table number from which the table 980 used by the user can be identified and a seat number from which the seat 981 of the user using the counter table **980*b*** can be identified. The attribute value related to a child is information that indicates whether the customer group includes a child, but may be information indicating the number of children. The preference information is, for example, information indicating a menu (the name of the item) specified by the user. The preference information may be automatically acquired based on the current or past order history.

The notification condition includes the condition as to whether the preference information of the user matches the item 5, the condition as to whether a predetermined time has elapsed since the user visited the restaurant, the condition as to whether the user includes a child, or the like. Based on the user information on each user, it is possible to determine whether the notification condition is satisfied.

The user information may include the notification record information as described above. For example, information identifying the item 5 to be notified, information identifying the item 5 to be a monitor target after the notification was performed, and information identifying the item 5 on which the second notification information should be output may be stored in association with each user identifier.

FIG. 5 is a diagram illustrating an example of the item information used by the information processing device 100.

In the example shown in the figure, as the item information, an attribute value such as a price, a target flag indicating that the item is a target item, and information indicating the item group to which each item belongs, is stored in association with the item identifier. As an item identifier, a name of the item (menu) is used, but is not necessarily limited to this. For example, names such as "tuna," "hamachi (yellowtail)," and "croquette" are used as the item identifiers. Each of the items 5 is associated with a price, a target flag (for example, "1" indicates the item is the target item), and a group identifier that identifies the item group to which the item 5 belongs.

FIG. 6 is a diagram illustrating an example of the status information used by the information processing device 100.

In the example shown in the figure, for each of the containers 10 on the conveying path 960, the item identifier of the corresponding item 5, the open/close state of the item 5 (i.e., the presence or absence of the item 5), and the relative position of the item 5 (e.g., the distance from the reference point) on the conveying path 960 may be stored as the status information. Each information is stored in association with the tool identifier that identifies each container 10. That is, the absolute position of each of the items 5 can be determined based on the rotational position of the conveying path 960 (e.g., an absolute position of the reference point in the restaurant; may be referred to as a position from each seat) and the status information. As the status information, information such as a time that has elapsed since the conveyance of each item 5 was started may be stored.

Based on such item information and status information, the position of each item 5 on the conveying path 960 at a particular time, the item identifier or price of the item 5, and information as to whether the item is the target item can be identified.

In the present embodiment, the information processing device 100 provides a notification function by, for example, performing various operations as follows. These operations are performed by the processing unit 140 executing control operations or the like using each of the units.

Figure 7:
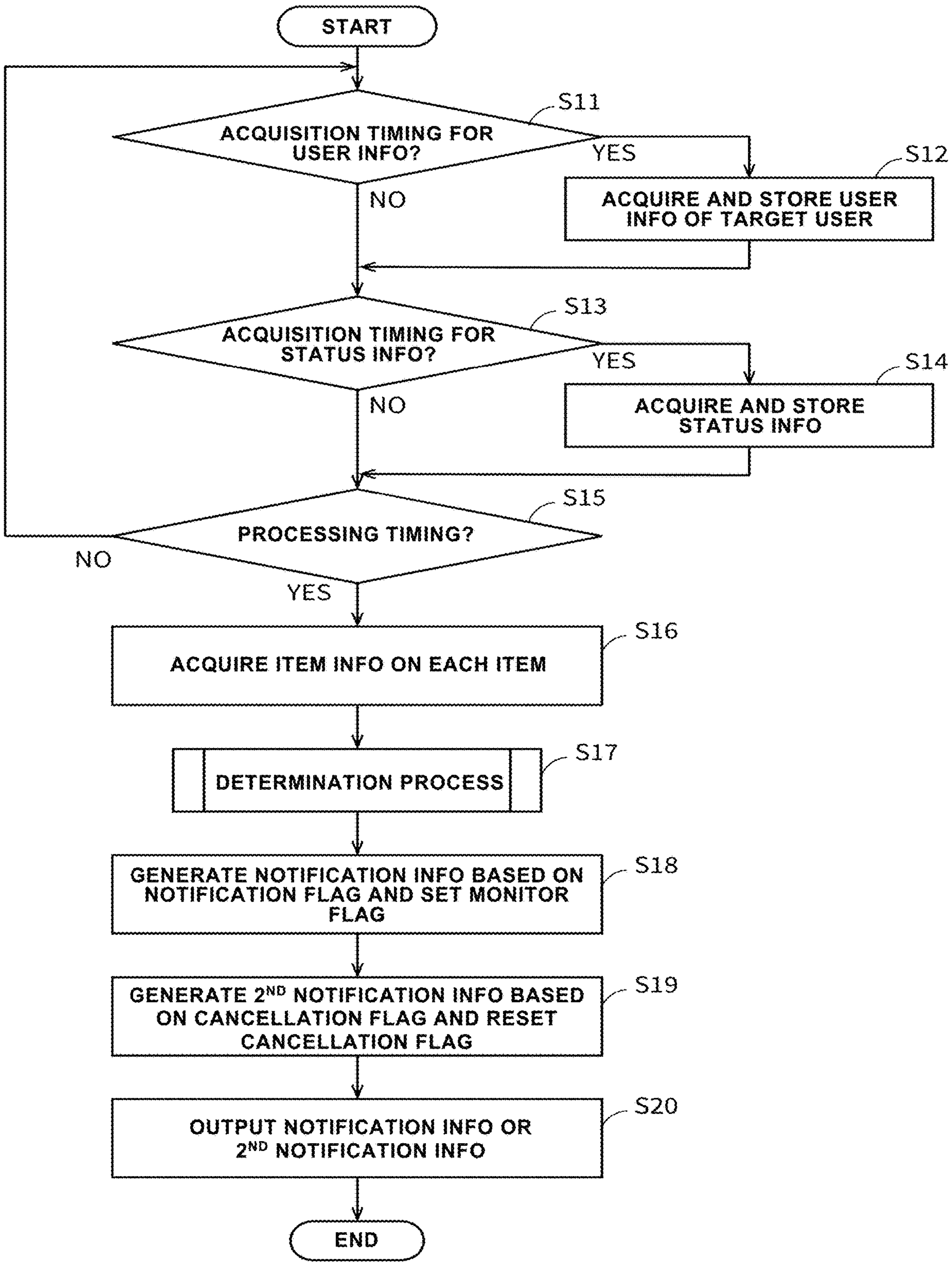
FIG. 7 is a flowchart illustrating one example of an operation by the information processing device.

FIG. 7 is a flowchart illustrating one example of the operation by the information processing device 100.

The process shown in the figure is regularly performed, for example, for each user (per customer group) visiting the restaurant.

(Step S11) The processing unit 140 determines whether an acquisition timing of the user information has come. If the acquisition timing is determined to have come, the process proceeds to step S12, otherwise the process proceeds to step S13.

(Step S12) The processing unit 140 acquires the user information on the target user. For example, the user information such as the number of people, the preference information, and the order history is acquired. The processing unit 140 stores the acquired user information in the user information storage unit 115. That is, the processing unit 140 updates the user information stored in the user information storage unit 115.

(Step S13) The processing unit 140 determines whether an acquisition timing of the status information has come. If the acquisition timing is determined to have come, the process proceeds to step S14, otherwise the process proceeds to step S15.

(Step S14) The processing unit 140 acquires the status information. The status information is acquired based on the detection result or the like of the item detection unit 970. The processing unit 140 stores the acquired information in the status information storage unit 113. That is, the processing unit 140 updates the status information stored in the status information storage unit 113.

(Step S15) The processing unit 140 determines whether a predetermined processing timing has come. If the processing timing is determined to have come, the process proceeds to step S16, otherwise the process proceeds to step S11.

(Step S16) The processing unit 140 acquires the item information on each of the items 5 that are being conveyed within the predetermined range on the conveying path 960 corresponding to the target user. For example, the processing unit 140 identifies (detects) the items 5 within the predetermined range based on the status information, and acquires the item information on each of the identified items 5 using the item identifier of each of the items 5. For example, the item information is acquired on the items 5 that are within a predetermined distance in an upstream direction from the seat of the target user.

(Step S17) The processing unit 140 performs a determination process on each of the identified items 5. The details of the determination process are as follows.

Figure 8:
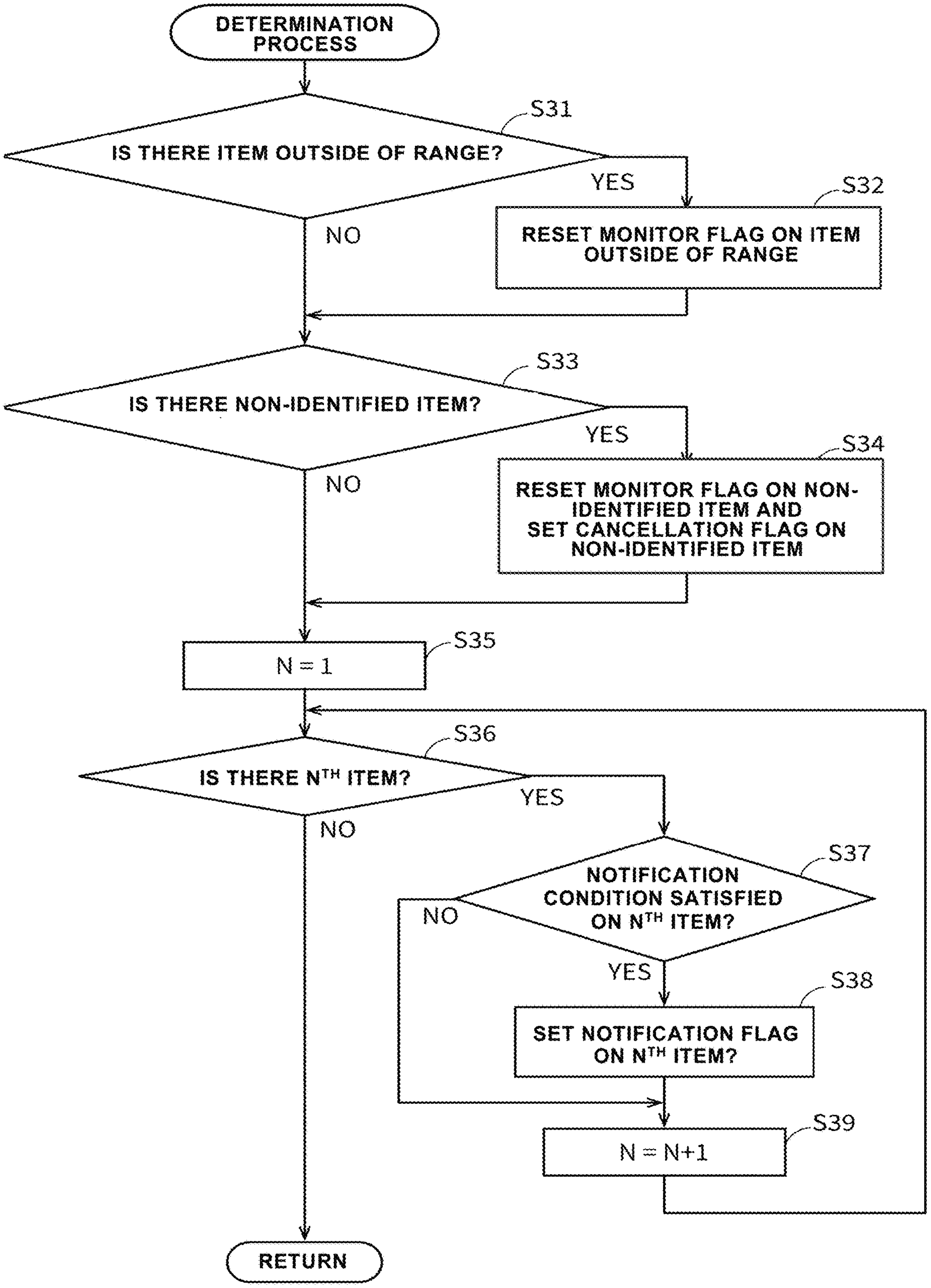
FIG. 8 is a flowchart illustrating one example of a determination process of the information processing device.

FIG. 8 is a flowchart illustrating one example of the determination process of the information processing device 100.

(Step S31) The processing unit 140 determines whether there is the item 5 outside of the predetermined range among the items 5 for which the monitor flags are set. If there is the item 5 outside of the range, the process proceeds to step S32, otherwise the process proceeds to step S33.

(Step S32) The processing unit 140 resets the monitor flag for the item 5 which is outside of the range this time.

(Step S33) The processing unit 140 determines whether there is the item 5 (a non-identified item) that is not included in the items 5 that are identified this time among the items 5 for which the monitor flags are set. If there is the item 5 not included in the identified items 5, the process proceeds to step S34; otherwise, the process proceeds to step S35.

(Step S34) The processing unit 140 resets the monitor flag on the item 5 not included in the currently identified items, and sets a cancellation flag on the non-identified item 5.

(Step S35) The processing unit 140 sets 1 to the variable N.

(Step S36) The processing unit 140 determines whether there is the N$^{th}$ item 5 among the identified items 5. If there is the N$^{th}$ item 5, the process proceeds to step S37, otherwise return to the upstream processes.

(Step S37) The processing unit 140 determines whether the predetermined notification condition is satisfied for the N$^{th}$ item 5 based on the item information on the N$^{th}$ item 5 and the user information. If the notification condition is determined to be satisfied, the process proceeds to step S38; otherwise, the process proceeds to step S39.

(Step S38) The processing unit 140 sets the notification flag for the N$^{th}$ item 5.

(Step S39) The processing unit 140 increments the variable N. Then, the process returns to step S36.

(Step S18) Returning to FIG. 7, the processing unit 140 generates the notification information relating to the item 5 to which the notification flag is associated (set), and sets the monitor flag on the item 5 by resetting the notification flag for the item 5.

(Step S19) The processing unit 140 generates the second notification information on the item 5 for which the cancellation flag is set, and resets the cancellation flag.

(Step S20) The processing unit 140 outputs the generated notification information or the generated second notification information in association with the user. Thus, the notification based on the notification information and the second notification information is performed. Thereafter, the series of processes are terminated.

In this way, when the notification information or the second notification information is output, the notification device 700 or the like may display a notification screen as follows to make a notification.

Figure 9:
FIG. 9 is a diagram illustrating one example of a screen in which a notification based on notification information is performed by a notification device.

FIG. 9 is a diagram illustrating an example of a screen in which a notification based on the notification information is performed by the notification device 700.

As shown in the figure, in the present embodiment, when a notification based on the notification information is performed by the notification device 700, a notification screen 81 is displayed on the notification display 761 of the notification device 700. The notification screen 81 may include, for example, an indication that a particular item 5 will reach the user's seat shortly or a message recommending purchasing the item 5. It should be noted that a guide image may be displayed to give expectation to the user on what item 5 will be conveyed without specifically notifying the user of the details of the item 5.

In this way, in the present embodiment, the notification information is output based on the determination result of the predetermined notification condition, and the notification is performed to the user. With such a notification function, the user can reliably notice that the item 5 to which the user should pay attention will come soon. Therefore, users can enjoy comfortable and enjoyable visiting experiences, which can improve the satisfaction of the users. It is possible to ensure that users are informed of the arrival of the target item of, e.g., a particular campaign item, and therefore the effects of the campaign can be enhanced.

The notification screen 81 may display a return button 812 for switching the page to a regular display screen (e.g., the order screen for ordering), and the user can switch the page to the normal display screen. Further, when a predetermined recovery condition is satisfied while the notification screen 81 is being displayed, the page may be switched to the normal display screen automatically. The recovery condition may be a condition that a predetermined time has elapsed or a condition that the monitor flag is reset.

Figure 10:
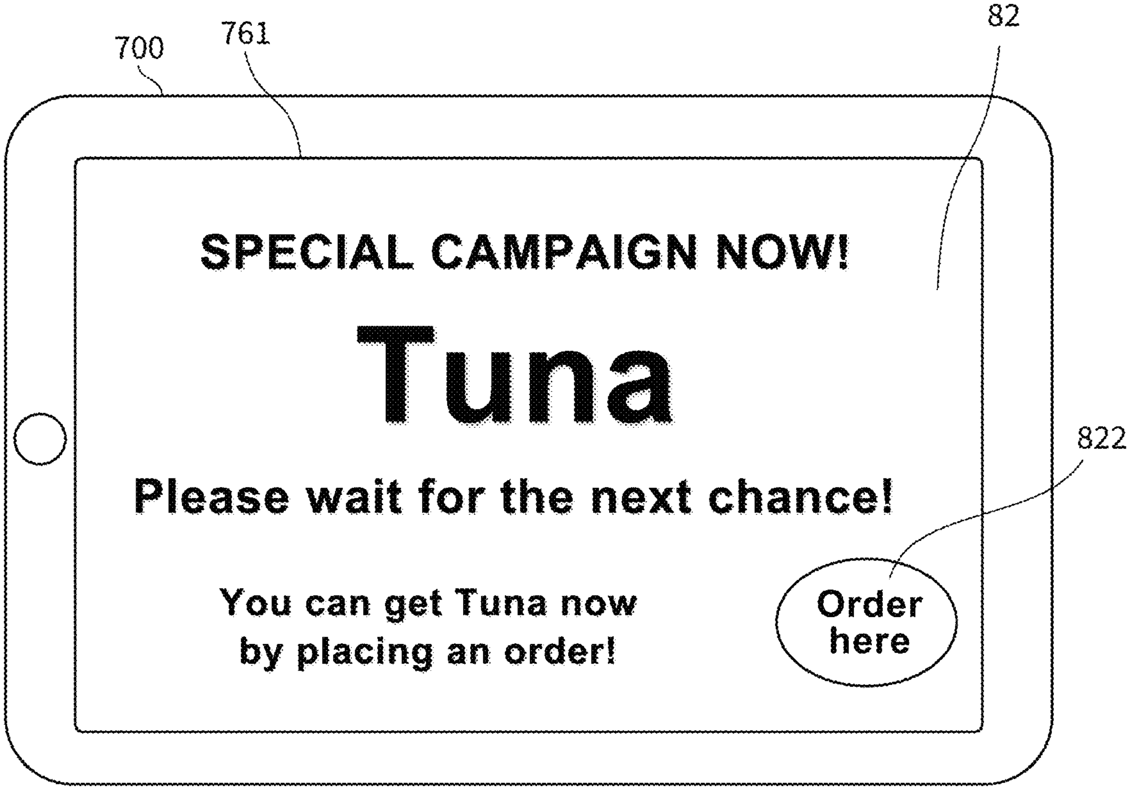
FIG. 10 is a diagram illustrating one example of a screen in which a notification based on second notification information is performed by the notification device.

FIG. 10 is a diagram illustrating an example of a screen in which a notification based on the second notification information is performed by the notification device 700.

As shown in the figure, in the present embodiment, when a notification based on the second notification information is performed by the notification device 700, a second notification screen 82 is displayed on the notification display 761 of the notification device 700. The second notification screen 82 includes, for example, a guide image for notifying the user that a particular item 5, for which the notification of arrival has been performed, will no longer come. By displaying the second notification screen 82, the user needs not wait for the item 5 that is no longer arriving, thereby avoiding in reducing the satisfaction of the user.

In the present embodiment, the second notification screen 82 includes an order button 822 for placing an order by the user for the item 5 that will no longer come. The user can reliably order the item 5 by operating the order button 822. Therefore, it is possible to further improve the user satisfaction.

However, instead of displaying the second notification screen 82 informing the user that such a particular item 5 will no longer come, the second notification information may inform the user that another item 5 will be conveyed to the user at this time. In this case, for the other item 5, it is desirable that the notification condition is satisfied, but not necessarily limited to this. For example, if there is an item 5 for which a different notification condition from the notification condition causing the notification information to be output is satisfied, the information processing device 100 may output the second notification information to notify the user of such an item 5.

Specifically, it is assumed that the notification info is output when either of a first condition that the item 5 is a campaign target item or a second condition that the item 5 matches the preference information of the user is satisfied. In such a case, after the notification information for notifying the user that the campaign target item will come soon was output upon determining that the first condition was satisfied, the second notification information is output when the cancellation flag is set for the target item. However, in such a case, when another item 5 satisfying the second condition will come soon, the second notification information informing the user that the other item 5 satisfying the second condition will come soon may be output instead of the information informing the user that the target item will no longer come. By doing so, it is possible to notify the user in a positive manner, thereby improving the satisfaction of the user.

The notification information or the second notification information is output to the terminal device 600, and the notification screen 81 or the second notification screen 82 may be displayed on the terminal display unit 661 of the terminal device 600. Further, when the notification is made by the terminal device 600, a notification may be made by a function such as a push notification.

The processing in this embodiment may be implemented by software. The software may be distributed by software download or the like. The software may also be stored and distributed on a storage medium such as an optical disk. In this embodiment, the software for implementing the information processing device 100 is a program as follows. That is, the program is executed by the computer of the information processing device 100. The program causes the computer to serve as an item information acquiring unit of acquiring item information on an item which is conveyed at a position upstream of the target user by the conveying device used in a restaurant for conveying the item, a determination unit of determining whether a predetermined notification condition is satisfied for the item based on the item information, and a notification information output unit of outputting notification information on the item in association with the user based on the determination result of the determination unit.

(Others)

Figure 11:
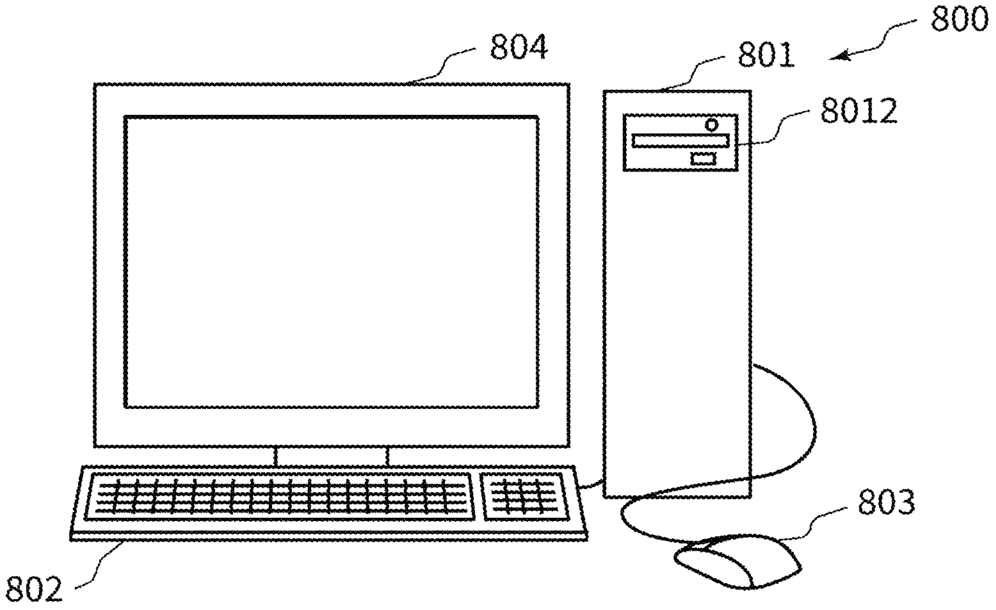
FIG. 11 is a schematic diagram of a computer system in the above embodiment.
Figure 12:
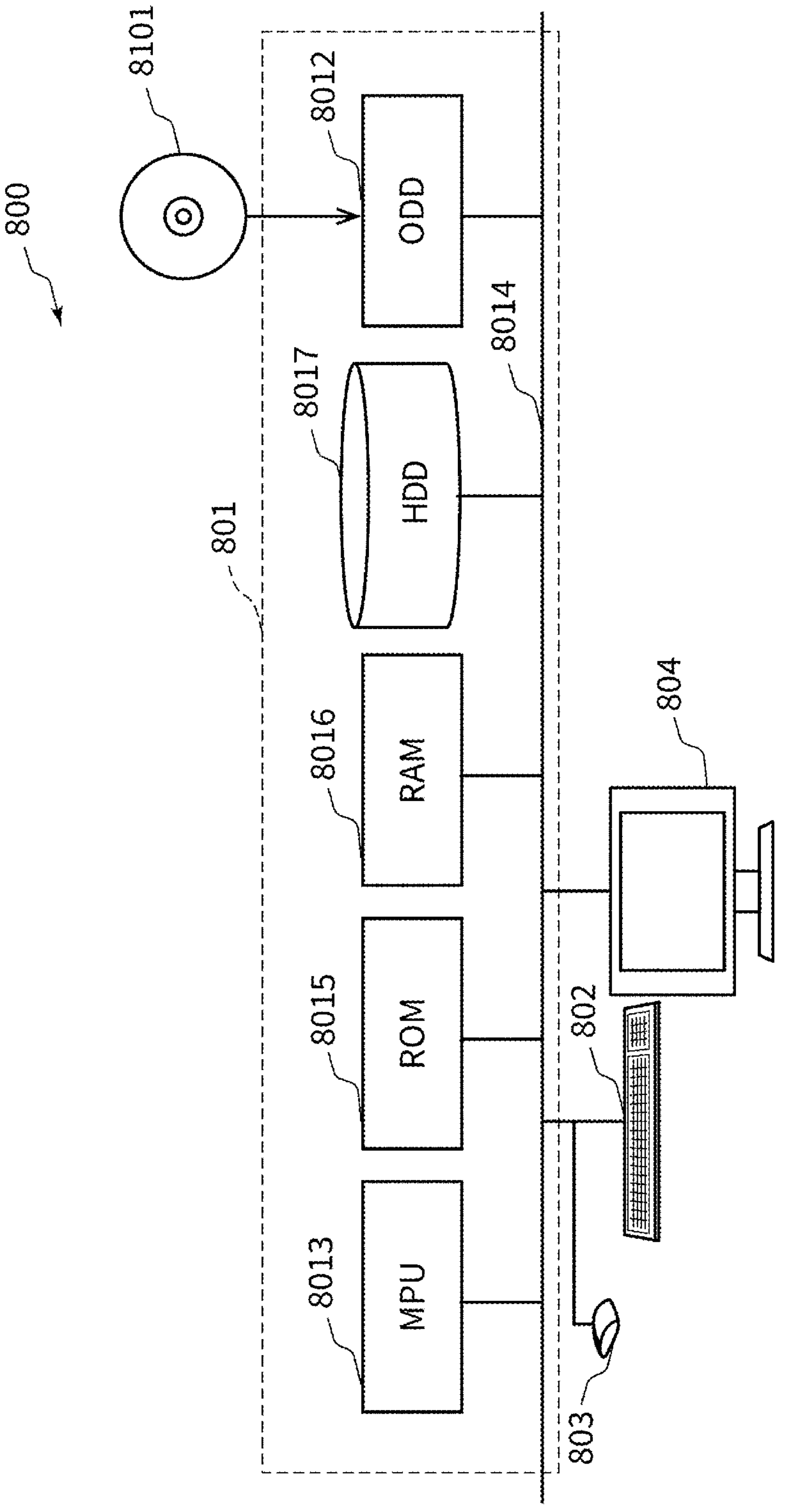
FIG. 12 is a block diagram of the computer system.

FIG. 11 is an overview view of a computer system 800 in the above embodiment. FIG. 12 is a block diagram of the computer system 800.

The figures illustrate one example of a computer that executes the program described herein to realize the information processing device or the like of the above-described embodiment. The above embodiments can be implemented with computer hardware and a computer program running on the hardware.

The computer system 800 includes a computer 801 that includes an optical disc drive, a keyboard 802, a mouse 803, and a monitor 804.

In addition to the optical disc drive (ODD) 8012, the computer 801 is connected to a MPU8013, a bus 8014 connected to the optical disc drive 8012, etc., and a ROM8015 for storing programs such as a boot-up program MPU8013, a RAM8016 for temporarily storing instructions of an application program and providing a temporary storage space, and a hard disk (HDD) 8017 for storing an application program, a system program, and data. Although not shown herein, the computer 801 may further include a network card that provides a connection to a LAN.

A program that causes the computer system 800 to execute a function of the information processing device of the above-described embodiment may be stored in the optical disk 8101, inserted into the optical disk drive 8012, or transferred to the hard disk 8017. Alternatively, the program may be transmitted to the computer 801 over a network not shown and stored on the hard disk 8017. The program is loaded into the RAM8016 when executed. The program may be loaded directly from the optical disc 8101 or the network.

The program does not necessarily include a third-party program or an operating system (OS) that causes the computer 801 to perform functions of the information processing device or the like in the above-described embodiments. The program may include only a portion of instructions that invoke the appropriate function (module) in a controlled manner to acquire the desired result. How the computer system 800 operates is well known, and a detailed description is omitted.

In the above program, the transmission step for transmitting information, the receiving step for receiving information, and the like include processing performed by hardware, for example, a modem or an interface card in the transmission step (processing performed only by hardware).

Further, the computer that executes the program may be singular or plural. That is, centralized processing may be performed, or distributed processing may be performed.

Further, in the above embodiment, two or more components present in one device may be physically realized in one medium.

In the above embodiment, each component may be configured by dedicated hardware, or for a component that can be realized by software, such a component may be realized by executing a program. For example, each component can be realized by a program execution unit such as a CPU reading and executing a software program recorded on a recording medium such as a hard disk or semiconductor memory. At the time of execution, the program execution unit may execute the program while accessing the storage unit or the storage medium. Further, the program may be executed by downloading from a server or the like, and may be executed by reading a program stored on a predetermined storage medium (for example, an optical disk, a magnetic disk, a semiconductor memory, etc.). Further, this program may be used as a program constituting a program product. Further, the computers that execute the program may be singular or plural. That is, centralized processing may be performed, or distributed processing may be performed.

Further, in the above embodiment, each process (each function) may be realized by centralized processing by a single device (system) or may be realized by being distributed by a plurality of devices (in this case, the entire system composed of a plurality of devices that perform distributed processing may be recognized as one "device").

Further, in the above embodiment, the transfer of information between each component may be performed, for example, when the two components that pass the information are physically different, by the output of information by one component and the reception of information by the other component. Alternatively, when the two components performing the transfer of information therebetween can be treated as the physically same, the transfer of information may be performed by shifting from the phase of processing on one component to the phase of processing on the other component.

Further, in the above embodiment, information related to the processing performed by each component (for example, information received, acquired, selected, generated, transmitted, received by each component), threshold values used by each component in processing, mathematical formulas, addresses, etc. may be stored for a long time, although not explicitly described. Further, each component or an accumulating unit (not shown) may accumulate information on the recording medium (not shown). Further, each component or a readout unit (not shown) may read out information from the storage medium (not shown).

Further, in the above embodiment, when information such as information used in each component or the like, such as threshold values, addresses, and various setting values used by each component in processing, may be changed by a user, the user may be able to change the information as appropriate, even if it is not specified in the above description. If the information can be changed by a user, the change may be realized, for example, by a non-illustrated reception unit that receives a change instruction from the user and a non-illustrated change unit that changes the information in response to the change instruction. The reception of the change instruction by the reception unit not shown may be, for example, acceptance from an input device, reception of information transmitted via a communication line, or acceptance of information read from a predetermined recording medium.

The present disclosure is not necessarily limited to the above embodiments, but can be modified in various ways, and they are also included within the scope of the present invention.

It is not limited to the configuration of the above-described embodiment itself, and each component of the above-described embodiment or modification may be appropriately substituted or combined with components such as other embodiments. Further, among the above-described embodiments and modifications, some components and functions may be omitted.

As described above, the information processing device according to the present invention has the advantageous effects of appropriately notifying the user of the information about the item to be conveyed to the user, and is useful as an information processing device or the like.

The invention claimed is:

1. A conveyance system at a restaurant, the conveyance system comprising:
- a conveying device used in the restaurant to convey items on a conveying path;
- a sensor configured to detect item information on an item conveyed on the conveying path at a position upstream of a seat of a target customer;
- a display device configured to display an image to the target customer; and
- an information processing device configured to:
  - determine whether a first predetermined condition is satisfied in response to the sensor detecting the item information; and
  - output first notification information on the item to the display device upon determining that the first predetermined condition is satisfied, wherein
  - the display device is configured to display a notification image to the target customer based on the first notification information,
- the information processing device is further configured to:
  - determine whether a second predetermined condition is satisfied after outputting the first notification information to the display device; and
  - output second notification information on the item to the display device upon determining that the second predetermined condition is satisfied, and
  - the display device is further configured to display, based on the second notification information, an order image operable for the target customer to order the item.

2. The conveyance system according to claim 1, wherein the information processing device is further configured to:
- acquire user information on the target customer; and
- determine whether the item information on the item satisfies the first predetermined condition in consideration of the acquired user information.

3. The conveyance system according to claim 2, wherein
- the information processing device is further configured to acquire preference information, which is related to a preference of the target customer, as the user information, and
- the first predetermined condition includes a condition relating to the preference information.

4. The conveyance system according to claim 2, wherein
- the information processing device is further configured to acquire the user information based on a current order history of items currently ordered by the target customer at the restaurant, and the first predetermined condition includes a condition relating to the current order history.

5. The conveyance system according to claim 2, wherein the information processing device is further configured to acquire the user information based on a past order history of items previously ordered by the target customer, and the first predetermined condition includes a condition relating to the past order history.

6. The conveyance system according to claim 2, wherein the information processing device is further configured to acquire the user information based on a predetermined attribute value relating to a state in which the target customer visits the restaurant.

7. The conveyance system according to claim 1, wherein the item information includes an item identifier that identifies a menu of the item or an item group to which the item belongs, and the first predetermined condition includes a condition relating to the item identifier.

8. The conveyance system according to claim 1, wherein the item information includes information as to whether the item is a predetermined target item, and the first predetermined condition includes a condition as to whether the item is the predetermined target item.

9. The conveyance system according to claim 1, wherein the information processing device is further configured to output the second notification information when the item on which the item information was detected by the sensor and satisfied the predetermined condition is not conveyed at a position upstream of the target customer after the notification information was output to the display device, and the display device is further configured to display a second notification image for notifying the target customer that the item is no longer conveyed in response to receiving the second notification information.

10. The conveyance system according to claim 1, wherein the display device is further configured to:

display a regular image for accepting an order from the target customer; and display a return button on the notification image for switching the notification image to the regular image.

11. The conveyance system according to claim 1, wherein the display device includes a first display device and a second display device, the information processing device is further configured to output the first and second notification information to the first and second display devices, respectively, the first display device is configured to display the notification image based on the first notification information, and the second display device is configured to display the order image based on the second notification information.

12. The conveyance system according to claim 11, wherein the first display device is disposed at the seat for the target customer, and the second display device is a smartphone held by the target customer.

13. A method at a restaurant, the method comprising:

conveying, with a conveying device, items on a conveying path in the restaurant;

detecting, with a sensor, item information on an item conveyed on the conveying path at a position upstream of a seat of a target customer;

determining whether a first predetermined condition is satisfied in response to the sensor detecting the item information;

outputting first notification information on the item to a display device upon determining that the first predetermined condition is satisfied;

displaying, with the display device, a notification image to the target customer based on the first notification information;

determining whether a second predetermined condition is satisfied after outputting the first notification information to the display device;

outputting second notification information on the item to the display device upon determining that the second predetermined condition is satisfied; and displaying, with the display device, an order image operable for the target customer to order the item based on the second notification information.

14. A conveyance system at a restaurant, the conveyance system comprising:

a conveying device used in the restaurant to convey items and advertising POPs on a conveying path;

a camera disposed at an upstream position upstream of a seat of a target customer, the camera configured to detect item information on an item at the upstream position by scanning an identification code on an advertising POP that is associated with the item and is conveyed on the conveying path;

a display device configured to display an image to the target customer; and an information processing device configured to output notification information on the item to the display device in response to the camera detecting the item information, wherein the display device is configured to display a notification image to the target customer based on the notification information.

15. The conveyance system of claim 14, wherein the information processing device is further configured to associate the advertising POP with the item based on a determination that a distance between the advertising POP and a container conveying the item on the conveying path is within a predetermined distance.

* * * * *